_United States Patent Office_

3,684,564
Patented Aug. 15, 1972

3,684,564
HEAT SEALABLE ELEMENTS
Emile Lefrancois, Ecully, France, assignor to
Societe Rhodiaceta
No Drawing. Continuation-in-part of application Ser. No. 702,824, Feb. 5, 1968. This application Sept. 14, 1970, Ser. No. 72,109
Claims priority, application France, Feb. 6, 1967, 93,866
Int. Cl. C09j 7/04
U.S. Cl. 117—122 H          10 Claims

ABSTRACT OF THE DISCLOSURE

Heat-sealable elements comprising a fibrous support having a coating of a mixture of copolyamide, aminoplast resin, and acid catalyst are useful inter alia in garment manufacture.

---

This application is a continuation-in-part of U.S. patent application Ser. No. 702,824, Stable Film Forming Compositions Based Upon Folamides, filed Feb. 5, 1968, and now abandoned.

The present invention relates to heat-sealable elements.

It has been proposed to use aminoplast resins, that is to say resins obtained by condensation of an aldehyde and an amine, in the precondensed state, to improve the anchoring of polyamide coatings on carriers. In certain cases aminoplast resin-polyamide compositions in an alcoholic medium have been employed. However these mixtures suffer from the disadvantage of being heterogeneous and leading to opague coatings. This heterogeneity persists if a modified polyamide of the N-alkoxyalkylated polyamide type is used.

It is also known to produce coatings from mixtures of N-alkoxyalkylated polyamides which are soluble in alcohols with an amineformaldehyde resin possessing alkoxyalkyl groups. However the coatings obtained do not have good stability to light and their high cost price precludes their use in many fields.

Furthermore the use of aminoplast resins alone leads to articles which are rigid or which gradually harden.

The present invention provides heat-sealable elements which give flexible assemblies which have good resistance to household washing, washing with hot water and dry cleaning, and which do not become detached. The flexibility of the assemblies is achieved by using an adhesive having good elasticity and good stability, which is essential for certain applications, for example in the field of garment manufacture.

The heat-sealable elements of the invention comprise a fibrous support having an at least partial coating of a mixture of (a) a copolyamide, (b) at least 15%, on the weight of the copolyamide, of a precondensed aminoplast resin containing alkoxyalkyl groups, and (c) a catalyst having an acid reaction. This coating is produced by depositing on the fibrous support a homogeneous composition which is stable at ambient temperature and consists of a solution of the copolyamide, the precondensed aminoplast resin, and the acid catalyst, in a solvent mixture containing at least 60% by volume of a lower aliphatic alcohol, and removing the said solvent.

Binary copolyamides such as those derived from hexamethylenediamine adipate and ε-caprolactam, ternary copolyamides such as those derived from hexamethylenediamine adipate and ε-caprolactam on the one hand and hexamethylenediamine sebacate or bis-(aminocyclohexyl)methane adipate or 2,2-bis-(aminocyclohexyl)-propane adipate on the other, copolyamides originating from more than three monomers, or mixtures of these copolyamides, can be used in the compositions which are deposited on the fibrous carrier to obtain the heat-sealable elements of the invention. Copolymers of high solubility which permit high concentrations to be obtained in an alcoholic medium are generally preferred, because they permit compositions suitable for various applications to be obtained by simple dilution to the chosen concentrations.

Precondensed aminoplast resins of the melamine-formaldehyde or urea-formaldehyde type modified by an alcohol, and in particular melamine-formaldehyde resins with alkoxyalkyl groups, are suitable for use in the solutions used in the invention. The percentage of alkoxyalkyl groups in the aminoplast resin can vary within wide limits. In the case of the methoxymethylated aminoplast resins, products containing at least 8% by weight of these groups are preferably used.

As the catalyst, a compound having an acid reaction such as an organic acid, for example maleic acid, lactic acid or citric acid, or an inorganic acid, or their derivatives, such as anhydrides, or their salts which are soluble in the solvent medium, can be used.

Particularly suitable solvents for the composition are alcohol-water mixtures such as ethanol-water or methanol-water used in a ratio of preferably 80/20 or alcohol-water-trichlorethylene in a ratio of preferably 85/5/10, the proportions being expressed by volume.

The compositions can be prepared in the cold by mixing a solution of the copolyamide and a solution of the aminoplast resin and adding the acid catalyst. The copolyamide solution is prepared by heating the polymer in the solvent at 50° to 60° C. until solution is complete, and then cooling. The compositions used in the invention are homogeneous and stable at ambient temperature and can without disadvantage be prepared some time before their use.

Any filler, plasticiser, dyestuff or other additive which is compatible with the mixture can be added to these compositions.

Deposition of these compositions on any fibrous carrier, such as a woven fabric, a knitted fabric, a non-woven fabric, or paper, based on synthetic or natural fibres, and removal of the solvent by heating to a temperature below 140° C. and preferably below 120° C., yields heat-sealable elements which are stable for some time and which can be used without difficulty after having been stored.

The carrier is coated with the composition by any appropriate conventional means, either by spraying or by a printing process or by, for example, using a doctor blade on a cylinder.

The heat-sealable elements thus obtained can be used as flexible linings for garments, bonding elements, repair patches for repairing industrial fabrics, or adhesive strips used for closing packages such as envelopes. They are applied with slight pressure to the desired article and glued by heating to a temperature above 140° C. but below any temperature at which the materials to be bonded or the composition itself begins to decompose, for a few seconds. The heat-sealing is, for example, effected by means of heating jaws or of a press.

The examples which follow illustrate the invention.

EXAMPLE 1

32 g. of a copolyamide produced from a mixture consisting of 21% by weight of hexamethylenediamine adipate, 54% by weight of caprolactam and 25% by weight of hexamethylenediamine sebacate, and 2 g. of coumaroneindene resin acting as a plasticiser, are dissolved in 54 g. of an 85/5/10, by volume, mixture of ethyl alcohol-water-trichlorethylene. The mixture is heated to 50–60° C. with stirring until solution is complete, and cooled to ambient temperature. 12 g. of an 80% solution of a melamine-formaldehyde resin containing 35% by weight of methoxymethyl groupings, in an 85/5/10, by volume, mixture of ethyl alcohol-water-trichlorethylene, are added. 0.5 g. of lactic acid is incorporated into this mixture and 120 g./m.$^2$ of solution is deposited at ambient temperature, by means of a doctor blade on a cylinder, onto a cotton fabric of very tight construction (75 g./m.$^2$). The solvent is evaporated in a tunnel oven at 80–100° C. until a dry coating weighing 53 g./m.$^2$ is obtained.

The fabric thus obtained is used to repair filter fabrics, industrial fabrics and belts by pressing at 180° C. between metal jaws or in a press.

EXAMPLE 2

16 g. of a copolyamide produced from a mixture consisting of 25% by weight of hexamethylenediamine adipate, 42% by weight of ε-caprolactam and 33% by weight of bis(aminocyclohexyl)methane adipate, and 2 g. of ethyltoluenesulphamide to act as plasticiser, are dissolved in 76 g. of an 80/20, by volume, mixture of ethyl alcohol-water. The mixture is heated to 50–60° C. with stirring until solution is complete, and then cooled to ambient temperature. 6 g. of the same aminoplast resin solution as in Example 1 and 0.3 g. of lactic acid to act as catalyst are added. This solution is sprayed in droplets, by an air-operated spray gun, onto the smooth face of a raised polyester/cotton fabric, so as to deposit 75 g./m.$^2$ of solution. After evaporation of the solvent as described in Example 1, a coating weighing 17 g./m.$^2$ of solids is obtained.

A heat-sealable interlining for garments is thus obtained, which can be used in garment manufacture, as a flexible lining, which can be entirely glued to a fabric by an electrically heated garment press in 15 seconds at 160° C.

EXAMPLE 3

A composition containing 64 g. of a 85/5/10, by volume, mixture of ethyl alcohol-water-trichlorethylene, 21 g. of a copolyamide produced from a mixture of 21% by weight of hexamethylenediamine adipate, 54% by weight of caprolactam and 25% by weight of hexamethylenediamine sebacate, 3 g. of a copolyamide produced from a mixture of 25% by weight of hexamethylenediamine adipate, 42% by weight of ε-caprolactam and 33% by weight of bis(aminocyclohexyl)methane adipate, 3 g. of ethyltoluenesulphamide as plasticiser, and 9 g. of the same aminoplast resin solution as that used in the preceding examples, is prepared as in Example 1. 0.4 g. of lactic acid is incorporated into this mixture and the solution is deposited in dots, by a rotary screen printing process, on a cotton fabric at the rate of 80 g./m.$^2$, in such a way that the solution does not impregnate the entire thickness of the fabric. After drying under the same conditions as described above, 28 g./m.$^2$ of solids are obtained.

The fabric coated in this way can be used as a heat-sealable article in the field of garment manufacture, as in the above example.

In a second use, the fabric can be bonded continuously, before complete drying of the solution, or by the use of a heated calender on issuing from the printing machine, to another textile such as lace or jersey, so as to obtain a special effect or so as to modify the dimensional stability or strength properties of the textile in question.

EXAMPLE 4

A composition is prepared as described in Example 2, but using 2 g. of coumarone-indene as plasticiser in place of the ethyltoluenesulphamide, and is deposited at the rate of 50 g./m.$^2$ on the edge of a wrapping paper by means of a rubber cylinder. After evaporation of the solvent, a coating weighing 12 g./m.$^2$ of solids is obtained.

The paper treated in this way can be coiled up to form an envelope which can be closed by heating jaws applied to the coated part at 180° C. for 2 seconds under a pressure of 3 kg./cm.$^2$.

EXAMPLE 5

21 g. of a copolyamide obtained from a mixture of 21% of hexamethylenediamine adipate, 54% of caprolactam and 25% of hexamethylenediamine sebacate, and 5 g. of ethyltoluenesulphamide as plasticiser, are added to 65 g. of an 80:20 mixture of ethyl alcohol and water, and the mixture is heated at 50°–60° C. with stirring until the solids are completely dissolved. After cooling to ambient temperature, 11 g. of an 80% solution of a melamine-formaldehyde resin comprising 35% of methoxymethyl groups in an 80:20 mixture of water and ethanol are added. 1.5 g. of lactic acid is incorporated into this solution.

The composition thus obtained is deposited by gun spraying at a rate of 90 g./m.$^2$ on a polyhexamethylene adipamide cloth for interlining. The whole is dried at 80° C. and then heat-bonded to a fabric by heating at 170° C. under pressure for 3 to 4 seconds. The assembly thus obtained has good resistance to domestic washing.

I claim:
1. A heat-sealable element comprising a fibrous support having an at least partial coating of a mixture of (a) a copolyamide, (b) at least 15%, on the weight of the copolyamide, of a precondensed aminoplast resin containing alkoxyalkyl groups, and (c) a catalyst having an acid reaction.

2. A heat-sealable element according to claim 1 in which the fibrous support is a woven, knitted or nonwoven fabric or paper.

3. A heat-sealable element according to claim 1 in which the said aminoplast resin is soluble and contains at least 8% by weight of alkoxyalkyl groups.

4. A heat-sealable element according to claim 1 in which the acid catalyst is maleic acid, lactic acid or citric acid.

5. A heat-sealable element comprising a textile material coated with a mixture of a copolyamide and at least 15% of its weight of a soluble precondensed aminoplast resin containing at least 8% by weight of alkoxyalkyl groups.

6. A heat-sealable element according to claim 1 in which the copolyamide (a) is selected from the group which consists of copolymers of (i) hexamethylenediamine adipate and caprolactam, and (ii) hexamethylenediamine adipate, caprolactam and a third monomer selected from hexamethylenediamine sebacate, bis(aminocyclohexyl)methane adipate, or 2,2 - bis(aminocyclohexyl)propane adipate.

7. A heat-sealable element according to claim 1 in which the aminoplast resin is a melamine-formaldehyde resin having methoxymethyl groups.

8. Process for the production of a heat-sealable element which comprises depositing on a fibrous support a composition comprising a solution of (a) a copolyamide, (b) at least 15% by weight, based on the copolyamide, of a precondensed aminoplast resin comprising alkoxyalkyl groups, and (c) a catalyst having an acid reaction, in a solvent mixture containing at least 60% by volume of a lower aliphatic alcohol and removing the said solvent therefrom.

9. Process according to claim 8 in which the said solvent comprises, in addition to the said alcohol, water or water and trichlorethylene.

10. Process according to claim 9 in which the alcohol is ethanol.

References Cited

UNITED STATES PATENTS

| | | | |
|---|---|---|---|
| 3,306,865 | 2/1967 | Wheeler et al. | 117—161 X |
| 3,370,972 | 2/1968 | Nagel et al. | 117—122 X |
| 3,515,702 | 6/1970 | Raabe | 117—161 X |

WILLIAM D. MARTIN, Primary Examiner

B. D. PIANALTO, Assistant Examiner

U.S. Cl. X.R.

117—3.4, 140 A, 155 L, 161 P, 161 LN; 161—227, 228, 229; 260—857 R